United States Patent [19]

Skvarenina

[11] 3,915,192

[45] Oct. 28, 1975

[54] PIERCING VALVE CONSTRUCTION

[76] Inventor: John A. Skvarenina, 2639 W. Augusta, Chicago, Ill. 60622

[22] Filed: Apr. 24, 1974

[21] Appl. No.: 463,542

[52] U.S. Cl. ............................. 137/318; 285/197
[51] Int. Cl.² .................... B23B 41/08; F16L 41/04
[58] Field of Search ..................... 137/318; 285/197

[56] References Cited
UNITED STATES PATENTS

| | | | |
|---|---|---|---|
| 2,555,303 | 6/1951 | Collins | 285/197 |
| 3,252,475 | 5/1966 | Jones | 137/318 |
| 3,698,419 | 10/1972 | Tura | 137/318 |
| 3,815,624 | 6/1974 | Mullins | 137/318 |

FOREIGN PATENTS OR APPLICATIONS

| | | | |
|---|---|---|---|
| 1,026,000 | 4/1966 | United Kingdom | 255/197 |

*Primary Examiner*—Alan Cohan
*Attorney, Agent, or Firm*—Olson, Trexler, Wolters, Bushnell & Fosse, Ltd.

[57] ABSTRACT

The embodiment of the invention disclosed herein is directed to a piercing valve structure for connection to a puncturable conduit to gain access to the interior of a closed refrigeration system for testing or applying refrigerant material into the system. The piercing valve has a cam lock collar member, extending from the valve body and a resilient pad located between the cam lock member and the valve body. The piercing valve is placed on the conduit and rotated approximately 90° about its longitudinal axis, which is perpendicular to the axis of the conduit, and thereby effects a sealing action of the area about the point to be pierced, a piercing action, and a locking action all in a single operation.

8 Claims, 6 Drawing Figures

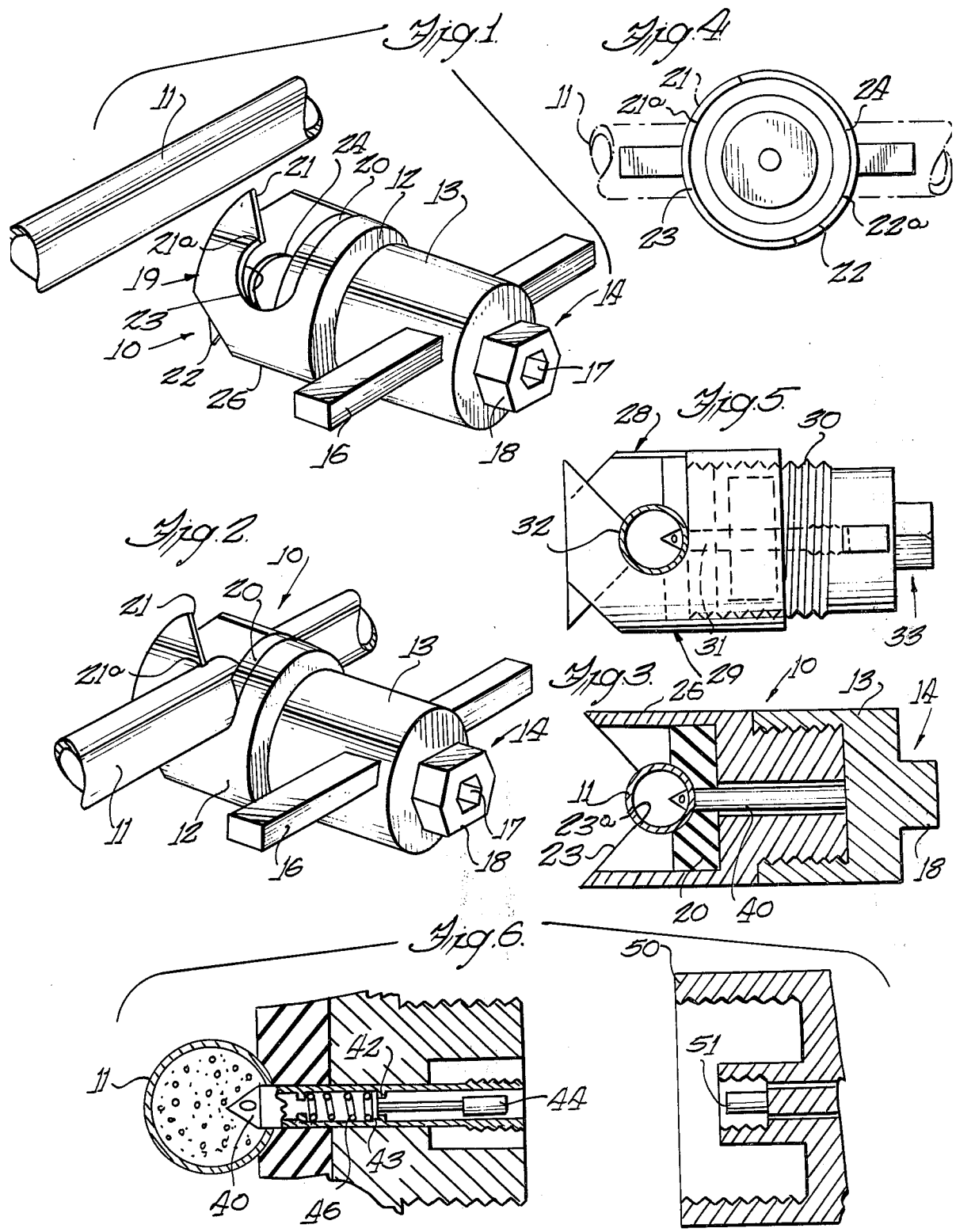

PIERCING VALVE CONSTRUCTION

BACKGROUND OF THE INVENTION

This invention relates generally to improvements in piercing valve structures used primarily in the field of refrigeration, including freezers, refrigerators and air conditioners and the like, and more particularly to a piercing valve which can be applied to a gas carrying refrigerating line by simple manual manipulation without the need of both hands or special tools. While the piercing valve structure of this invention is intended primarily for use in connection with refrigerating systems, it will be understood that the valve structure disclosed herein can be used in other fields wherein access to the interior of fluid or gaseous carrying conduit lines is necessary without causing leakage or loss of pressure from the interior of the conduit or line.

Heretofore, piercing valve structures used in the field of refrigeration have been of the type having a piercing member extending from the valve body and a C-shaped clamp securable to the valve body by a pair of socket head screws, or the like. The clamp is urged against the conduit from behind and it requires the person applying the piercing valve to use both hands, one to hold the clamp in registry with the valve body and the other to manipulate a wrench or screw driver. In many instances the requirement of two hand manipulation to secure the valve to a conduit is difficult if not impossible without dismantling the refrigerating system.

SUMMARY OF THE INVENTION

Accordingly, it is an object of this invention to provide a new and improved piercing valve structure which is adapted for application to conduits by one hand manipulation without the use of tools for tightening a clamping member.

Still another object of this invention is to provide a new and improved piercing valve structure which is simple and inexpensive to manufacture while being efficient and reliable in use.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a perspective view illustrating a piercing valve constructed in accordance with the principles of this invention and is shown placed adjacent a conduit to which it is to be applied;

FIG. 2 illustrates the piercing valve of FIG. 1 secured to the conduit;

FIG. 3 is a side sectional view of one form of piercing valve constructed in accordance with the principles of this invention;

FIG. 4 is an end view of the piercing valve of FIG. 3;

FIG. 5 is another form of piercing valve constructed in accordance with the principles of this invention; and FIG. 6 illustrates the piercing valve fastened to a conduit and pressure gauge or fluid supply conduit fastening means positioned adjacent thereto for connection therewith.

DETAILED DESCRIPTION OF THE ILLUSTRATED EMBODIMENTS

Referring first to FIGS. 1, 2 and 3, there is seen one embodiment of a piercing valve constructed in accordance with the principles of this invention and designated generally by reference numeral 10. The piercing valve 10 is adapted for connection to a puncturable conduit 11 of the type commonly found in refrigerating systems, it being either copper, brass or aluminum in most instances. The conduit 11 is punctured to gain access to the interior of the refrigerating system so that the quantity and pressure of refrigerant therein can be tested or added to.

The piercing valve 10 has a valve body 12 which has a threaded cap member 13 secured thereto for protecting the threads which are to receive the pressure gauge or the like and for providing applicator means designated generally by reference numeral 14. The applicator means here is illustrated as taking the form of either a T-bar 16 or a socket hexagon receptacle 17 or a hexagon wrench receiving nut portion 18. Any one of these forms facilitates the operator to grasp the piercing valve by one hand and align a cam lock configuration 19 formed at the opposite end thereof and place it on the conduit and fasten it thereto.

Most advantageously, the cam lock configuration 19 is formed about and extending axially from a resilient pad member 20 which forms the seal for the piercing valve. The cam lock member is formed by diametrically opposed spaced apart angle surface portions 21 and 22 leading into circular portions 23 and 24, respectively. To obtain the cam lock action, the circular portions 23 and 24 have a peripheral edge axially displaced from the resilient member a distance greater than the terminating edges 21a and 22a of the angled edges. Therefore, as the piercing valve is rotated about the conduit 11, the conduit will slide along the angled edges 21 and 22 while compressing the resilient pad member 20. Also the piercing valve will have a puncturable needle member thereof penetrate the wall of the conduit to gain access to the interior thereof. Once the conduit passes the terminating edges 21a and 22a, it will be urged against the circular portion as a result of the bias obtained from the resilient pad 20. While the cam lock configuration 19 is formed as an integral part of a collar member 26 extending from the valve body 12, it will be understood that it can be formed as a separate part threadedly connected to the valve body, or connected thereto by other suitable means.

Referring now to FIG. 5, an alternate piercing valve construction is illustrated. Here a cam locking configuration 28 is formed at one end of a threaded collar or sleeve 29 which is threadedly connected to a valve body 30. The valve body 30 may be of the same general configuration as the valve body 12 having a piercing valve 31 formed therein for gaining access to the interior of the conduit portion 32. Applicator means 33 are formed at one end of the valve body to facilitate connecting the valve body to the conduit by one hand manipulation as described above.

The resilient pad member 20 may be formed of any suitable resilient material such as rubber, neoprene, or the like, and preferably has a resiliency sufficient to provide substantial axial bias of the piercing valve against the conduit 11 when captured within the circular portions 23 and 24.

FIG. 6 clearly illustrates the type of valve structure located within the piercing element 40 of the piercing valve 10. The piercing element 40 includes a valve seat 42 and a cap or annular seating element 43 secured to a stem member 44. Spring means 46 is provided within the valve housing. When external connection is to be made to the valve by means of a connector 50, the valve stem member 44 is depressed by a protuberance 51 associated with the coupling 50. This structural arrangement is well-known in the art and forms no part of the invention.

What has been described is a simple and efficient means for manually fastening a piercing valve to a refrigerating line or conduit by single hand manipulation without the use of expensive or special tools. Variations and modifications to this valve configuration may be effected without departing from the spirit and scope of the novel concepts disclosed and claimed herein.

The invention is claimed as follows:

1. A piercing valve for connection to a puncturable conduit to gain access to the interior thereof, comprising: a valve body, a depressable valve member positioned within said valve body for selective sealing and opening with respect to the conduit interior, a piercing member associated with said depressable valve and extending from said valve body, resilient means axially displaced from said valve body and surrounding said piercing member, and cam-like means formed about and extending axially from said resilient member, said cam means including a collar member having an axis transverse to the conduit axis, said collar having a diametrically opposed spaced apart angled surfaces leading into a conduit engaging portion which has a peripheral edge surface axially displaced from said resilient means a distance greater than the terminating edge of said angled surface, whereby said piercing valve is lockingly secured to the conduit as a result of the force obtained by said resilient means urging said conduit engaging portion firmly against the side of the conduit opposite said resilient means.

2. In the piercing valve for connection to a puncturable conduit to gain access to the interior thereof as set forth in claim 1, wherein said valve body and said cam means are formed as an integral unit.

3. In the piercing valve for connection to a puncturable conduit to gain access to the interior thereof as set forth in claim 1, wherein said valve body and said cam means are threadedly connected to one another.

4. In the piercing valve for connection to a puncturable conduit to gain access to the interior thereof as set forth in claim 1, wherein said valve body includes cap means threadedly connected thereto and having applicator means extending therefrom for manual manipulation thereby permitting the piercing valve to be manually fastened to the desired conduit.

5. In the piercing valve for connection to a puncturable conduit to gain access to the interior thereof as set forth in claim 4, wherein said applicator means is a hexagon-shaped socket.

6. In the piercing valve for connection to a puncturable conduit to gain access to the interior thereof as set forth in claim 1, wherein said applicator means is a T-handle.

7. In the piercing valve for connection to a puncturable conduit to gain access to the interior thereof as set forth in claim 1, wherein said applicator means includes a hexagon head wrench receiving member.

8. In the piercing valve for connection to puncturable conduit to gain access to the interior thereof as set forth in claim 1, wherein said conduit engaging portion is circular in configuration.

* * * * *